(12) United States Patent
Brannon et al.

(10) Patent No.: US 9,058,495 B2
(45) Date of Patent: Jun. 16, 2015

(54) RIGHTS MANAGEMENT SERVICES INTEGRATION WITH MOBILE DEVICE MANAGEMENT

(71) Applicant: Sky Socket, LLC, Atlanta, GA (US)

(72) Inventors: Jonathan Blake Brannon, Mableton, GA (US); Christian Blake Sorensen, Atlanta, GA (US)

(73) Assignee: AirWatch LLC, Atlanta, GA (US)

( * ) Notice: Subject to any disclaimer, the term of this patent is extended or adjusted under 35 U.S.C. 154(b) by 99 days.

(21) Appl. No.: 13/895,739

(22) Filed: May 16, 2013

(65) Prior Publication Data

US 2013/0254837 A1  Sep. 26, 2013

(51) Int. Cl.
*H04K 1/00* (2006.01)
*G06F 21/60* (2013.01)
*G06F 21/10* (2013.01)

(52) U.S. Cl.
CPC ............... *G06F 21/60* (2013.01); *G06F 21/10* (2013.01); *G06F 2221/2111* (2013.01)

(58) Field of Classification Search
CPC ....... H04L 63/20; G06F 21/10; G06F 21/105; G06F 21/12; G06F 21/121; G06F 21/60; G06F 21/6218; G06F 21/629; G06F 2221/2111
USPC ........... 726/1, 26–33; 713/165–167, 189, 193
See application file for complete search history.

(56) References Cited

U.S. PATENT DOCUMENTS

| | | | |
|---|---|---|---|
| 5,574,786 A | 11/1996 | Dayan et al. | |
| 5,987,609 A | 11/1999 | Hasebe | |
| 6,021,492 A | 2/2000 | May | |
| 6,023,708 A | 2/2000 | Mendez et al. | |
| 6,085,192 A | 7/2000 | Mendez et al. | |
| 6,131,096 A | 10/2000 | Ng et al. | |
| 6,131,116 A | 10/2000 | Riggins et al. | |
| 6,151,606 A | 11/2000 | Mendez | |
| 6,233,341 B1 | 5/2001 | Riggins | |
| 6,449,721 B1 * | 9/2002 | Pensak et al. | ................. 713/171 |
| 6,560,772 B1 | 5/2003 | Slinger | |
| 6,708,221 B1 | 3/2004 | Mendez et al. | |
| 6,714,859 B2 | 3/2004 | Jones | |

(Continued)

FOREIGN PATENT DOCUMENTS

| | | |
|---|---|---|
| CA | 2149337 A1 | 6/1994 |
| GB | 2346716 A | 8/2000 |
| WO | 0241661 A2 | 5/2002 |

OTHER PUBLICATIONS

Asynchrony Software, Inc., , "PDA Defense User Guide", 726, 2002.

(Continued)

*Primary Examiner* — Hosuk Song
(74) *Attorney, Agent, or Firm* — Thomas | Horstemeyer, LLP

(57) ABSTRACT

Rights management services (RMS) integration with mobile device management (MDM) may be provided. A functionality associated with a document may be restricted according to a document management policy. After the document has been transmitted to a receiving device, a request to un-restrict the at least one functionality associated with the document may be received. If it is determined that the receiving device complies with the document management policy, the functionality associated with the document may be un-restricted.

15 Claims, 3 Drawing Sheets

(56) References Cited

U.S. PATENT DOCUMENTS

| | | |
|---|---|---|
| 6,726,106 B1 | 4/2004 | Han et al. |
| 6,727,856 B1 | 4/2004 | Hill |
| 6,741,232 B1 | 5/2004 | Siedlikowski et al. |
| 6,741,927 B2 | 5/2004 | Jones |
| 6,766,454 B1 | 7/2004 | Riggins |
| 6,779,118 B1 | 8/2004 | Ikudome et al. |
| 6,904,359 B2 | 6/2005 | Jones |
| 6,965,876 B2 | 11/2005 | Dabbiere |
| 6,995,749 B2 | 2/2006 | Friend |
| 7,032,181 B1 | 4/2006 | Farcasiu |
| 7,039,394 B2 | 5/2006 | Bhaskaran |
| 7,039,679 B2 | 5/2006 | Mendez et al. |
| 7,064,688 B2 | 6/2006 | Collins et al. |
| 7,092,943 B2 | 8/2006 | Roese et al. |
| 7,184,801 B2 | 2/2007 | Farcasiu |
| 7,191,058 B2 | 3/2007 | Laird et al. |
| 7,203,959 B2 | 4/2007 | Nachenberg et al. |
| 7,213,266 B1 * | 5/2007 | Maher et al. .................. 726/26 |
| 7,225,231 B2 | 5/2007 | Mendez et al. |
| 7,228,383 B2 | 6/2007 | Friedman et al. |
| 7,275,073 B2 | 9/2007 | Ganji et al. |
| 7,284,045 B1 | 10/2007 | Marl et al. |
| 7,287,271 B1 | 10/2007 | Riggins |
| 7,308,703 B2 | 12/2007 | Wright et al. |
| 7,310,535 B1 | 12/2007 | MacKenzie et al. |
| 7,353,533 B2 | 4/2008 | Wright et al. |
| 7,363,349 B2 | 4/2008 | Friedman et al. |
| 7,363,361 B2 | 4/2008 | Tewari et al. |
| 7,373,517 B1 | 5/2008 | Riggins |
| 7,437,752 B2 | 10/2008 | Heard et al. |
| 7,444,375 B2 | 10/2008 | McConnell et al. |
| 7,447,506 B1 | 11/2008 | MacKenzie et al. |
| 7,447,799 B2 | 11/2008 | Kushner |
| 7,475,152 B2 | 1/2009 | Chan et al. |
| 7,496,957 B2 | 2/2009 | Howard et al. |
| 7,539,665 B2 | 5/2009 | Mendez |
| 7,565,314 B2 | 7/2009 | Borgeson et al. |
| 7,590,403 B1 | 9/2009 | House et al. |
| 7,594,224 B2 | 9/2009 | Patrick et al. |
| 7,603,547 B2 | 10/2009 | Patrick et al. |
| 7,603,548 B2 | 10/2009 | Patrick et al. |
| 7,603,703 B2 | 10/2009 | Craft et al. |
| 7,617,222 B2 | 11/2009 | Coulthard et al. |
| 7,620,001 B2 | 11/2009 | Ganji |
| 7,620,392 B1 | 11/2009 | Maurya et al. |
| 7,650,491 B2 | 1/2010 | Craft et al. |
| 7,660,902 B2 | 2/2010 | Graham et al. |
| 7,665,118 B2 | 2/2010 | Mann et al. |
| 7,665,125 B2 | 2/2010 | Heard et al. |
| 7,685,645 B2 | 3/2010 | Doyle et al. |
| 7,702,322 B1 | 4/2010 | Maurya et al. |
| 7,702,785 B2 | 4/2010 | Bruton, III et al. |
| 7,735,112 B2 | 6/2010 | Kim et al. |
| 7,735,122 B1 | 6/2010 | Johnson et al. |
| 7,739,334 B1 | 6/2010 | Ng et al. |
| 7,752,166 B2 | 7/2010 | Quinlan et al. |
| 7,788,382 B1 | 8/2010 | Jones et al. |
| 7,792,297 B1 | 9/2010 | Piccionelli et al. |
| 7,840,631 B2 | 11/2010 | Farcasiu |
| 7,890,091 B2 | 2/2011 | Puskoor et al. |
| 7,912,896 B2 | 3/2011 | Wolovitz et al. |
| 7,917,641 B2 | 3/2011 | Crampton |
| 7,970,386 B2 | 6/2011 | Bhat et al. |
| 8,001,082 B1 | 8/2011 | Muratov |
| 8,012,219 B2 | 9/2011 | Mendez et al. |
| 8,041,776 B2 | 10/2011 | Friedman et al. |
| 8,046,365 B2 * | 10/2011 | Saito .......................... 707/741 |
| 8,046,823 B1 | 10/2011 | Begen et al. |
| 8,060,074 B2 | 11/2011 | Danford et al. |
| 8,069,144 B2 | 11/2011 | Quinlan et al. |
| 8,078,157 B2 | 12/2011 | Maurya et al. |
| 8,094,591 B1 | 1/2012 | Hunter et al. |
| 8,117,344 B2 | 2/2012 | Mendez et al. |
| 8,150,431 B2 | 4/2012 | Wolovitz et al. |
| 8,225,381 B2 | 7/2012 | Lemke |
| 8,751,798 B2 * | 6/2014 | Ayars et al. .................. 713/165 |
| 2002/0013721 A1 | 1/2002 | Dabbiere et al. |
| 2003/0110084 A1 | 6/2003 | Eberhard et al. |
| 2003/0204716 A1 | 10/2003 | Rockwood et al. |
| 2004/0123153 A1 | 6/2004 | Wright et al. |
| 2004/0181687 A1 | 9/2004 | Nachenberg et al. |
| 2004/0224703 A1 | 11/2004 | Takaki et al. |
| 2005/0246192 A1 | 11/2005 | Jauffred et al. |
| 2006/0190984 A1 | 8/2006 | Heard et al. |
| 2007/0033397 A1 | 2/2007 | Phillips, II et al. |
| 2007/0136492 A1 | 6/2007 | Blum et al. |
| 2007/0156897 A1 | 7/2007 | Lim |
| 2007/0174433 A1 | 7/2007 | Mendez et al. |
| 2007/0261099 A1 | 11/2007 | Broussard et al. |
| 2007/0288637 A1 | 12/2007 | Layton et al. |
| 2008/0133712 A1 | 6/2008 | Friedman et al. |
| 2008/0134305 A1 | 6/2008 | Hinton et al. |
| 2008/0134347 A1 | 6/2008 | Goyal et al. |
| 2008/0201453 A1 | 8/2008 | Assenmacher |
| 2009/0036111 A1 | 2/2009 | Danford et al. |
| 2009/0144632 A1 | 6/2009 | Mendez |
| 2009/0198997 A1 | 8/2009 | Yeap et al. |
| 2009/0260064 A1 | 10/2009 | McDowell et al. |
| 2009/0300739 A1 | 12/2009 | Nice et al. |
| 2009/0307362 A1 | 12/2009 | Mendez et al. |
| 2010/0005125 A1 | 1/2010 | Mendez et al. |
| 2010/0005157 A1 | 1/2010 | Mendez et al. |
| 2010/0005195 A1 | 1/2010 | Mendez et al. |
| 2010/0023630 A1 | 1/2010 | Mendez et al. |
| 2010/0100641 A1 | 4/2010 | Quinlan et al. |
| 2010/0120450 A1 | 5/2010 | Herz |
| 2010/0144323 A1 | 6/2010 | Collins et al. |
| 2010/0146269 A1 | 6/2010 | Baskaran |
| 2010/0254410 A1 | 10/2010 | Collins |
| 2010/0268844 A1 | 10/2010 | Quinlan et al. |
| 2010/0273456 A1 | 10/2010 | Wolovitz et al. |
| 2010/0299152 A1 | 11/2010 | Batchu et al. |
| 2010/0299362 A1 | 11/2010 | Osmond |
| 2010/0299376 A1 | 11/2010 | Batchu et al. |
| 2010/0299719 A1 | 11/2010 | Burks et al. |
| 2011/0004941 A1 | 1/2011 | Mendez et al. |
| 2011/0082900 A1 | 4/2011 | Nagpal et al. |
| 2011/0113062 A1 | 5/2011 | Quinlan et al. |
| 2011/0145932 A1 | 6/2011 | Nerger et al. |
| 2011/0153779 A1 | 6/2011 | Mendez et al. |
| 2011/0153799 A1 | 6/2011 | Ito |
| 2011/0167474 A1 | 7/2011 | Sinha et al. |
| 2011/0202589 A1 | 8/2011 | Piernot et al. |
| 2011/0225252 A1 | 9/2011 | Bhat et al. |
| 2011/0270799 A1 | 11/2011 | Muratov |
| 2011/0276805 A1 | 11/2011 | Nagpal et al. |
| 2011/0296186 A1 | 12/2011 | Wong et al. |
| 2011/0320552 A1 | 12/2011 | Friedman et al. |
| 2012/0005578 A1 | 1/2012 | Hawkins |
| 2012/0015644 A1 | 1/2012 | Danford et al. |
| 2012/0102392 A1 | 4/2012 | Reesman et al. |
| 2012/0198547 A1 | 8/2012 | Fredette et al. |
| 2013/0061307 A1 | 3/2013 | Livne |
| 2013/0152169 A1 | 6/2013 | Stuntebeck |

OTHER PUBLICATIONS

Belani, Eshwar et al., "The CRISIS Wide Area Security Architecture", 726, 1998.
Benaloh, Josh et al., "Patent Controlled Encryption: Ensuring Privacy of Electronic Medical Records", 726, Nov. 13, 2009.
Fox, Armando et al., "Security on the Move: Indirect Authentication Using Kerberos", 726, 1996.
Menaria, Pankaj et al., "Security in Mobile Database Systems", 707, 726, Mar. 17, 2011.
Pfitzmann, Andreas et al., "Mobile User Devices and Security Modules: Design for Trustworthiness", 726, Feb. 5, 1996.
Steiner, Jennifer , "Kerberos: An Authentication Service for Open Network Systems", 726, Jan. 12, 1988.
Strunk, John et al., "Self-Securing Storage: Protecting Data in Compromised Systems", Symposium on Operating Systems Design and Implementation, 726, 2000.

* cited by examiner

RIGHTS MANAGEMENT SERVICES INTEGRATION WITH MOBILE DEVICE MANAGEMENT

BACKGROUND

Administrators of devices such as cell phones and laptops often install security features to prevent the accidental sharing or loss of important data. Such measures may include mobile device management profiles that require various security settings, such as a passcode or password, to be enabled on the device before confidential or proprietary resources can be accessed. However, in some situations, the user's device may comply with the security requirements, but the resources may be further shared to devices that are outside of the administrator's control. When this happens, the security requirements may be compromised.

SUMMARY

This Summary is provided to introduce a selection of concepts in a simplified form that are further described below in the Detailed Description. This Summary is not intended to identify key features or essential features of the claimed subject matter nor is this Summary intended to be used to limit the claimed subject matter's scope.

Rights management services (RMS) integration with mobile device management (MDM) may be provided. A functionality associated with a document may be restricted according to a document management policy. After the document has been transmitted to a receiving device, a request to un-restrict the at least one functionality associated with the document may be received. If it is determined that the receiving device complies with the document management policy, the functionality associated with the document may be un-restricted.

It is to be understood that both the foregoing general description and the following detailed description are examples and explanatory only, and should not be considered to restrict the disclosure's scope, as described and claimed. Further, features and/or variations may be provided in addition to those set forth herein. For example, embodiments of the disclosure may be directed to various feature combinations and sub-combinations described in the detailed description.

BRIEF DESCRIPTION OF THE DRAWINGS

Many aspects of the present disclosure can be better understood with reference to the following diagrams. The drawings are not necessarily to scale. Instead, emphasis is placed upon clearly illustrating certain features of the disclosure. Moreover, in the drawings, like reference numerals designate corresponding parts throughout the several views. In the drawings.

DETAILED DESCRIPTION

Figure 1:
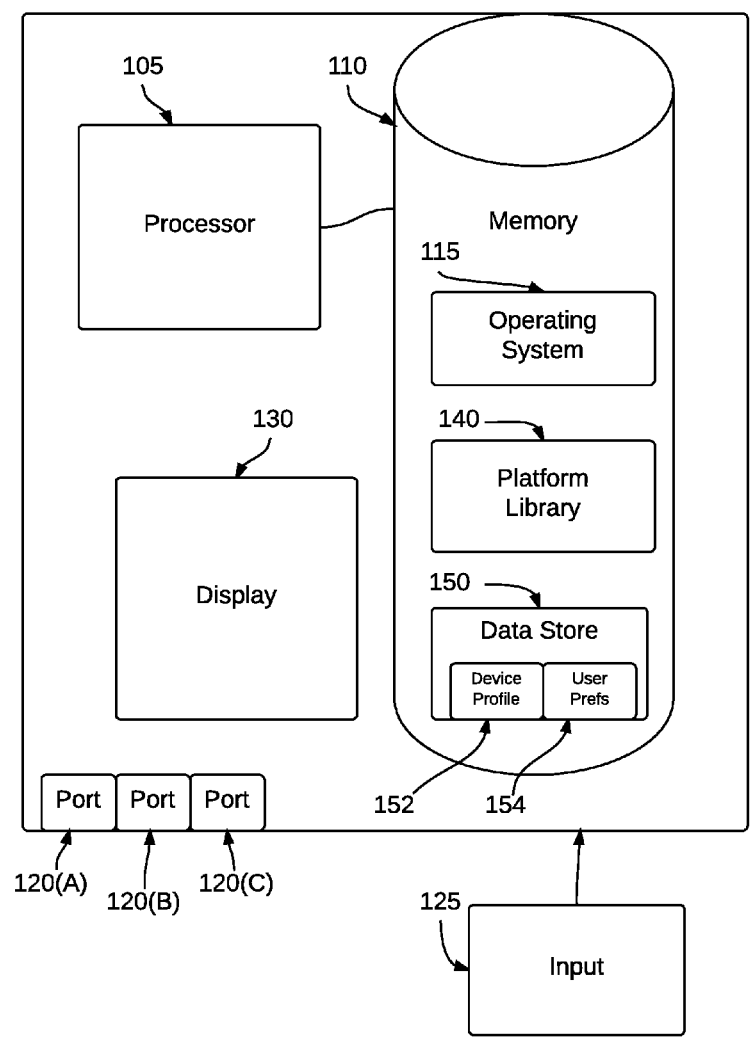
FIG. 1 is a block diagram of a user device.

The following detailed description refers to the accompanying drawings. Wherever possible, the same reference numbers are used in the drawings and the following description to refer to the same or similar elements. While embodiments of the disclosure may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the following detailed description does not limit the disclosure. Instead, the proper scope of the disclosure is defined by the appended claims.

Interoperability between managed and non-managed devices may be provided. In order to ensure that resources shared with non-managed devices utilize at least a minimal level of security, a wrapper may be put around communications with non-managed devices requiring some credentials or security settings before the communication is displayed. For example, an email recipient may need to have a passcode-protected device and/or encrypted e-mail client configuration before the recipient and view/open the email and attachments.

Rights Management Services (RMS) may be used to provide some of these security requirements. RMS is a form of Information Rights Management (i.e., technology which protects sensitive information from unauthorized access) that uses encryption and a form of selective functionality denial for limiting access to resources such as corporate e-mail, spreadsheets, documents, and web pages, etc., and the operations authorized users can perform on them. Companies can use this RMS to encrypt information stored in such document formats and prevent the protected content from being decrypted except by specified people or groups, in certain environments, under certain conditions, and for certain periods of time. These security requirements may be enforced through policies embedded in the documents. Specific operations like printing, copying, editing, forwarding, and deleting can be allowed or disallowed by content authors for individual pieces of content, and RMS administrators can deploy RMS templates that group these rights together into pre-defined rights that can be applied en masse.

The technical effects of certain embodiments of the disclosure may include establishing control of access to networks and resources when access lists may not be predefined, and reducing and/or eliminating the burden of predefining access lists to control access to networks and resources. Moreover, the technical effects of certain embodiments of the invention may include enhancing network access control by assigning specific access rights based on access lists to client devices authorized to access associated network beacons and resources.

To reduce the cost of ownership of user devices and cellular and/or data service charges associated with use of such user devices, a business may implement a "bring your own device" (BYOD) policy to allow an employee to use his/her personal device to access business resources rather than provide the employee with a business owned user device for such purpose. To support such a BYOD policy, a user device administrator (i.e. IT administrator) may manage a group of personally owned user devices, via a management application executed by a management server in communication with the user devices over a network, to provide the user devices with secure access to business resources.

The user device administrator may enroll user devices into the management system to monitor the user devices for security vulnerabilities and to configure the user devices for secure access to business resources. The user device administrator may create and/or configure at least one configuration profile via a user interface provided by the management system. A configuration profile may comprise a set of instructions and/or settings that configure the operations and/or functions of a user device, which may ensure the security of the accessed resources. The user device administrator may, for instance, configure a business email configuration profile by specifying the network address and access credentials of a business email account that the users of the user devices are authorized to access. Other configuration policies may include, but are not limited to, hardware, software, application, function, cellular, text message, and data use restrictions, which may be based at least in part on the current time and/or location of the restricted user device. The user device administrator may thereafter deploy the configuration profiles to specific user devices, such as to groups of user devices of employees with similar roles, privileges and/or titles.

The user devices may also have access to personal configuration profiles that may be created by the users of the user devices. The user devices may, for instance, have access to a personal email configuration profile that was created by a user of the user device to provide access to her personal email account. Thus, a user device enrolled in a BYOD management system may have more than one configuration profile for a given use of the user device, such as a personal email configuration profile and a business email configuration profile that are both used for accessing email accounts on the user device.

The user devices may be instructed to enable and/or disable certain configuration profiles according to authorization rights specified by the user device administrator, such as location and/or time-based authorization rights. For example, a BYOD policy may specify that user devices enrolled in the BYOD management system are authorized for personal use outside of the workday and are authorized for business use during the workday. Similarly, a BYOD device may be restricted to business uses while in work locations and/or prohibited from accessing business resources while outside of secure work locations. To implement such a policy, a user device administrator may instruct the user devices to toggle between personal configuration policies and business configuration policies based on factors such as the current time and/or location associated with the user device. The current time may be based on the current time at the current location of the user device, which may be determined by GPS, Wi-Fi, Cellular Triangulation, etc., or may be based on the current time at a configured primary location associated with the user device, which may be the primary office location of an employee user of the user device. As an example, time-based configuration profile toggling may be provided by instructing a user device to enable business configuration profiles and disable personal configuration profiles while the current time is between 9 AM and 5 PM at the current location of the user device, and to disable business configuration profiles and enable personal configuration profiles while the current time is between 5 PM and 9 AM at the current location of the user device.

FIG. 1 is a block diagram of a user device 100 comprising a processor 105 and a memory 110. Depending on the configuration and type of device, memory 110 may comprise, but is not limited to, volatile (e.g. random access memory (RAM)), non-volatile (e.g. read-only memory (ROM)), flash memory, or any combination. Memory 110 may store executable programs and related data components of various applications and modules for execution by user device 100. Memory 110 may be coupled to processor 105 for storing configuration data and operational parameters, such as commands that are recognized by processor 105.

Basic functionality of user device 100 may be provided by an operating system 115 contained in memory 100. One or more programmed software applications may be executed by utilizing the computing resources in user device 100. Applications stored in memory 110 may be executed by processor 105 (e.g., a central processing unit or digital signal processor) under the auspices of operating system 115. For example, processor 105 may be configured to execute applications such as web browsing applications, email applications, instant messaging applications, and/or other applications capable of receiving and/or providing data.

Data provided as input to and generated as output from the application(s) may be stored in memory 110 and read by processor 105 from memory 110 as needed during the course of application program execution. Input data may be data stored in memory 110 by a secondary application or other source, either internal or external to user device 100, or possibly anticipated by the application and thus created with the application program at the time it was generated as a software application program. Data may be received via any of a plurality of communication ports 120(A)-(C) of user device 100. Communication ports 120(A)-(C) may allow user device 100 to communicate with other devices, and may comprise components such as an Ethernet network adapter, a modem, and/or a wireless network connectivity interface. For example, the wireless network connectivity interface may comprise one and/or more of a PCI (Peripheral Component Interconnect) card, USB (Universal Serial Bus) interface, PCMCIA (Personal Computer Memory Card International Association) card, SDIO (Secure Digital Input-Output) card, NewCard, Cardbus, a modem, a wireless radio transceiver, and/or the like.

User device 100 may also receive data as user input via an input component 125, such as a keyboard, a mouse, a pen, a stylus, a sound input device, a touch input device, a capture device, etc. A capture device may be operative to record user(s) and capture spoken words, motions and/or gestures, such as with a camera and/or microphone. The capture device may comprise any speech and/or motion detection device capable of detecting the speech and/or actions of the user(s).

Data generated by applications may be stored in memory 110 by the processor 105 during the course of application program execution. Data may be provided to the user during application program execution by means of a display 130. Consistent with embodiments of this disclosure, display 130 may comprise an integrated display screen and/or an output port coupled to an external display screen.

Memory 110 may also comprise a platform library 140. Platform library 140 may comprise a collection of functionality useful to multiple applications, such as may be provided by an application programming interface (API) to a software development kit (SDK). These utilities may be accessed by applications as necessary so that each application does not have to contain these utilities thus allowing for memory consumption savings and a consistent user interface.

Furthermore, embodiments of this disclosure may be practiced in conjunction with a graphics library, other operating systems, or any other application program and is not limited to any particular application or system. The devices described with respect to the Figures may have additional features or functionality. For example, user device 100 may also include additional data storage devices (removable and/or non-removable) such as, for example, magnetic disks, optical disks, or tape (not shown).

User device 100 may comprise a desktop computer, a laptop computer, a personal digital assistant, a cellular telephone, a set-top box, a music player, a web pad, a tablet computer system, a game console, and/or another device with like capability. The preceding list comprises examples and is not intended to be limiting.

User device 100 may store in a data store 150 a device profile 152 and a user profile 154. Device profile 152 may comprise, for example, an indication of the current position of user device 100 and/or indications of the hardware, software, and security attributes, which describe user device 100. For instance, device profile 152 may represent hardware specifications of user device 100, version and configuration information of various software program and hardware components installed on user device 100, data transmission protocols enabled on user device 100, version and usage information of various resources stored on user device 100, and/or any other attributes associated with the state of user device 100. The device profile 152 may further comprise data indicating a date of last virus scan of user device 100, a date of last access by an IT representative, a date of last service by the IT representative, and/or any other data indicating maintenance and usage of user device 100. Furthermore, the device profile 152 may comprise indications of the past behavior of associated users, such as resources accessed, charges for resource accesses, and the inventory accessed from such resources. The device profile 152 may also comprise device identifiers that may uniquely identify the user device 100. In some embodiments, the device identifiers may be a unique hardware identifier such as a GUID (Globally Unique Identifier), UUID (Universally Unique Identifier), UDID (Unique Device Identifier), serial number, IMEI (Internationally Mobile Equipment Identity), Wi-Fi MAC (Media Access Control) address, Bluetooth MAC address, a CPU ID, and/or the like, or any combination of two or more such hardware identifiers. In some embodiments, the device identifier may be a unique software identifier such a token or certificate, based at least in part on the aforementioned unique hardware identifiers.

User profile 154 may comprise one or more user identifiers that uniquely identify the user of the user device 100 and/or a listing of factors that may affect the experience of the user. In some embodiments, the user identifiers may include a username, a password, and/or biometric data related to facial recognition, retina recognition, fingerprint recognition, and the like. The user preferences may comprise indications of the user's age, gender, bodily traits, preferred resource types, preferred venue resources, and combinations thereof.

Figure 2:
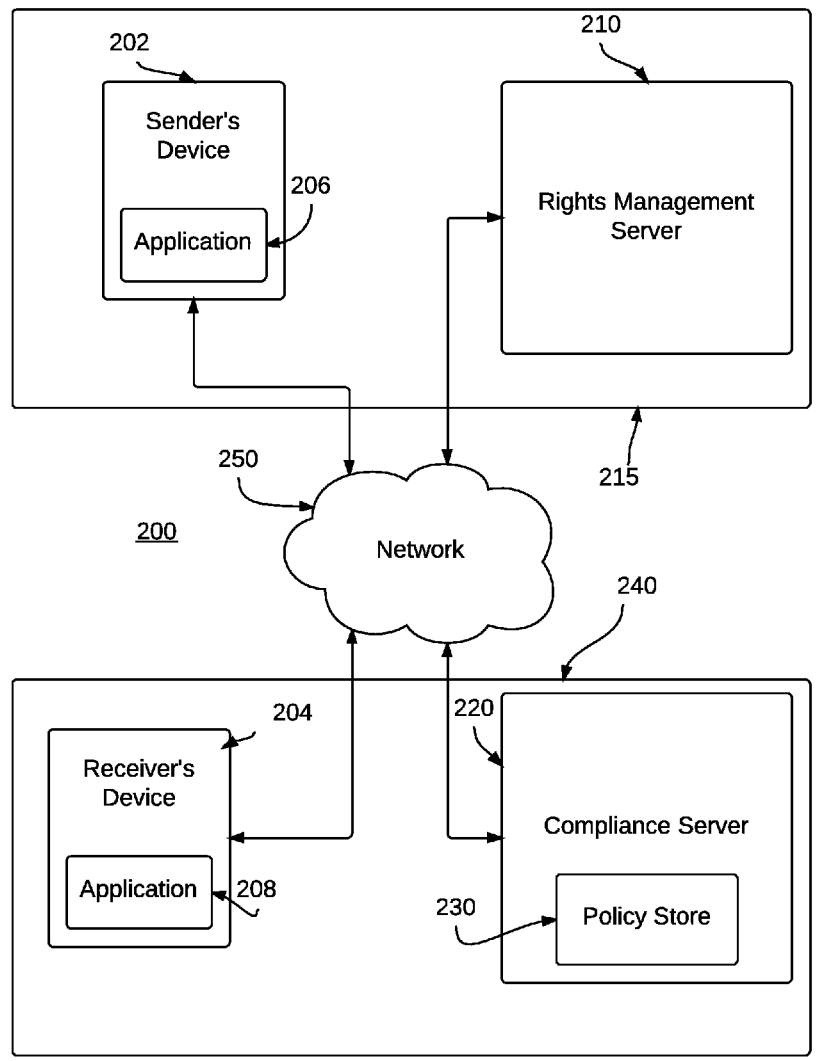
FIG. 2 is a block diagram of an operating environment.

FIG. 2 is a block diagram view of an operating environment 200 comprising a sender's device 202 and a receiver's device 204, each of which may comprise an instance of user device 100 as described above. Sender's device 202 may be operative to execute a first application 206 that may be operative to transmit a document to a second application 208 executing on receiver's device 206. Operating environment 200 may further comprise a rights management server 210 associated with a first organization 215 and a compliance server 220 comprising a policy store 230 associated with a second organization 240. Computing devices associated with first organization 215 and second organization 240 may be operative to communicate via a network 250. In some embodiments, network 250 may comprise a public network, such as the Internet. Further, devices within each organization may be operative to communicate via a private network (not shown), such as a local area network (LAN).

In some embodiments, both first organization 215 and second organization 240 may each comprise a rights management server 210 and a compliance server 220 and/or a single computing device internal or external to each organization may provide the functionality associated with rights management server 210 and compliance server 220.

The rights management server 210 and the compliance server 220 may comprise, for example, cloud-based solutions, server computers and/or any other system providing device management capability. For purposes of convenience, the rights management server 210 and the compliance server 220 are referred to herein in the singular, although it is understood that a plurality of servers may be employed in the arrangements as descried herein. Furthermore, in some embodiments, multiple rights management servers 210 and/or compliance servers 220 may operate on the same server computer. The components executed on the rights management server 210 and/or the compliance server 220, for example, may comprise various applications, services, processes, systems, engines, or functionality not disclosed in detail herein.

The compliance server 220 may comprise policy store 230 comprising a plurality of compliance rules and/or policies that may be applicable to user device 100. While the policy store 230 is shown as within the compliance server 220, the policy store 230 may alternately be within the user device 100 and/or located on the rights management server 210 and may be remotely updated periodically by compliance server 220 according to common over-the-air (OTA) updating methods.

Attempts by user device 100 to perform certain functionality on user device 100 may require user device 100 to be in compliance with one and/or more of the compliance policies/rules. Depending on the sensitivity of a given functionality, different compliance rules may be necessary to ensure that the functionality is adequately restricted. Some functionality may only require ensuring that the proper user is requesting the functionality. Other resources may require compliance with more stringent authorization rules, such as determining whether the functionality is restricted during certain time windows. Accordingly, user device 100 and/or compliance server 220 may be operative to determine whether the user of user device 100 is authorized to perform requested functionality at the time the user requests to perform such functionality.

Compliance server 220 may use the compliance rules to impose hardware restrictions regarding the use of specific wireless devices and specific wireless device features, such as, for instance, cameras, Bluetooth, IRDA, tethering, external storage, a mobile access point, and/or other hardware restrictions. The compliance rules may also impose software restrictions such as the use of specific wireless device operating systems or applications, internet browser restrictions, screen capture functionality, and/or other software restrictions. Mobile device management restrictions included in the compliance rules may comprise encryption requirements, firmware versions, remote lock and wipe functionalities, logging and reporting features, GPS tracking, and/or other mobile device management features.

The compliance server 220 may determine whether the device characteristics of a requesting device (e.g. user device 100) satisfy one or more of the restrictions enumerated in the compliance rules. For example, the compliance server 220 may determine that a requesting device that has a camera, Bluetooth capability, and is executing a specified version of an operating system is compliant with the compliance rules. As another example, the compliance server 220 may determine that a requesting device that is associated with an external storage unit and has screen capture functionality enabled is not compliant with the compliance rules.

The rights management server 210 may be operative to provide security for documents and/or messages being sent outside the organization. For example, sender's device 202 may request rights management server 210 to restrict some functionalities associated with the document and/or encrypt the document prior to transmitting the document to receiver's device 204. In some embodiments, rights management server 210 may intercept such outbound documents and/or messages without a request from the sender's device 202. Rights management server may also be operative to provide notice of security requirements and/or management policies that must be in effect on receiver's device 204 before the restricted functionality may be un-restricted and/or the contents of the document/message may be decrypted.

In some embodiments, the application 206, 208 executed on user device 100 may make the compliance determination based on the device profile, credentials, and/or user preferences. For instance, the application 206, 208 may comprise an agent application operative to monitor calls by other applications, such as a web browser and/or an e-mail client, on user device 110 to the operating system 115 of user device 100 to determine whether user device 110 seeks to perform functionality associated with one and/or more of the compliance rules described above. Additionally, the application 206, 208 on user device 100 may approve and/or deny the associated functionality requests. For instance, the application 206, 208 may instruct operating system 115 on user device 100 to disable the camera of user device 100 in response to a determination that a compliance rule specifies that the camera cannot be used at the time of the request by the user device 100 to operate the camera.

In some embodiments, the application 206, 208 executed on user device 100 may rely on compliance server 220 to determine whether a given functionality request on user device 100 is permitted according to the compliance rules. For instance, the agent application may transmit a functionality request, a device profile, credentials, and/or user preferences to compliance server 220 so that compliance server 220 may determine whether user device 110 seeks to perform functionality that may violate a given compliance rule. Additionally, compliance server 220 may approve and/or deny the associated functionality requests. For instance, compliance server 220 may instruct the application 206, 208 on user device 100 to instruct operating system 115 to activate a VPN security profile prior to opening a document and/or link.

In some embodiments, the compliance rules may comprise device settings and/or executable instructions that define which functionality the operating system 115 of user device 100 is authorized to perform. Furthermore, the compliance rules may comprise a list of functions, such as those provided by APIs associated with operating system 115 and/or platform library 140, that may be treated as protected functions. Calls to these functions, such as calls to retrieve login credentials, may result in checks by user device 100 and/or compliance server 220 for compliance with the compliance rules.

In some embodiments, the application 206, 208 may perform a set of ordered operations to accomplish a requested function. These operation sets may be defined by the user device 100 and/or compliance server 220 and may comprise one and/or more operations to determine whether the user device 100 is in compliance with policies from policy store 230. The application 206, 208 may control at least one respective computing resource of the user device 100. The operations may include configuring at least one respective computing resource of the user device 100 such as restricting access to at least one resource managed by the application 206, 208.

The Network 250 may comprise, for example, any type of wired and/or wireless network such as a wireless local area network (WLAN), a wireless wide area network (WWAN), Ethernet, fiber-optic network, and/or any other type of wired and/or wireless network now known or later developed. Additionally, the Network 250 may be or include the Internet, intranets, extranets, microwave networks, satellite communications, cellular systems, PCS, infrared communications, global area networks, or other suitable networks, etc., or any combination of such networks.

Figure 3:
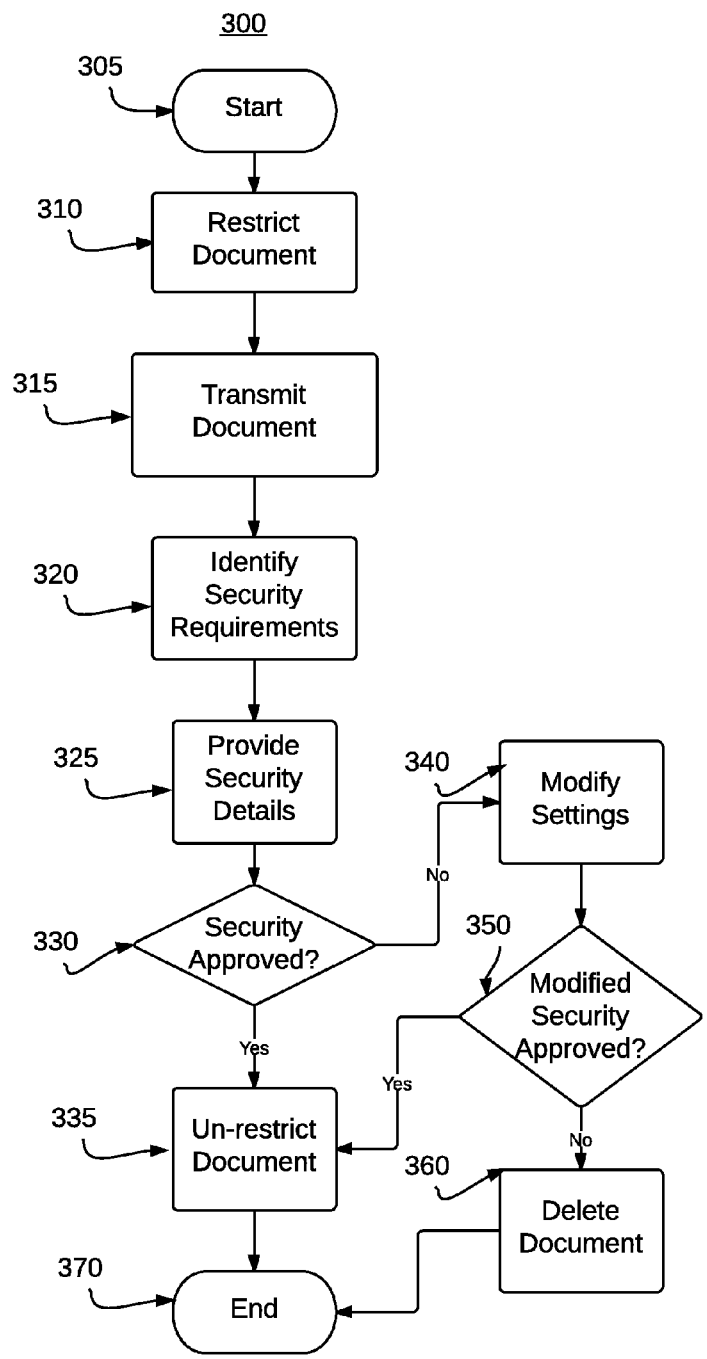
FIG. 3 is a flow chart illustrating a method for providing rights management services integration with mobile device management.

FIG. 3 is a flow chart setting forth the general stages involved in a method 300 consistent with embodiments of this disclosure for providing rights management server (RMS) integration with Mobile Device Management (MDM). Method 300 may be implemented using elements of operating environment 200 as described above. Ways to implement the stages of method 300 will be described in greater detail below. Method 300 may begin at starting block 305 and proceed to stage 310 where user device 100 may restrict a document. For example, application 206 may determine that a document is going to be transmitted to a recipient outside of the sender's organization 215. In response, rights management server 210 may restrict some of the functionality associated with the document, such as by encrypting the document to prevent its being opened/read or applying meta tags that prohibit the document from being printed, forwarded, copied, etc. The document may be embedded with an address associated with rights management server 210 so that the receiver's device 204 may later communicate with the rights management server 210 in order to identify what requirements may need to be met before the functionality may be unrestricted.

In some embodiments, rights management server 210 may intercept outgoing messages from the sender's organization 215 and determine whether the messages comprise restricted data that needs the functionality restriction put in place. Such restriction policies may apply to all messages and/or documents send outside of the organization and/or may apply only to certain types of documents (e.g., spreadsheets), and/or may apply to documents comprising certain content (e.g., the word "confidential".)

Method 300 may then advance to stage 315 where user device 100 may transmit the document to a recipient. For example, sender's device 202 may send the document over network 250 to receiver's device 204 via e-mail, text message, voicemail, FTP, web upload, and/or any of a plurality of methods now known or contemplated in the future. In some embodiments, messages being transmitted to receiver's organization 240 may be scanned for security threats and/or requirements prior to being delivered to the recipient. For example, receiver's organization 240 may perform an anti-virus scan on the transmitted document and/or may intercept delivery of any incoming encrypted documents for automatic rejection and/or review by an IT or security administrator.

Method 300 may then advance to stage 320 where user device 100 may identify any security requirements associated with the document. For example, receiver's device 204 may determine that the document is encrypted and a decryption key may be retrieved from rights management server 210. For another example, receiver's device 204 may comprise a plurality of device management policies and/or profiles that impose various restrictions, such as requiring a passcode be used on the device, and the document may require that such policies may be installed and/or active on receiver's device 204 before the document may be opened. For another example, the document may comprise requirements that a particular application and/or specific version of an application be used to perform certain functions, such as opening the document.

Method 300 may then advance to stage 325 where user device 100 may provide the security details associated with the identified security requirements. For example, application 208 may attempt to open the transmitted document and identify that at least a certain version must be installed to open the document. Receiver's device 204 may verify that the application 208 meets this criteria before the document is opened. Such verification may comprise, for example, calculating a checksum on the application's code and comparing it to a known value and/or transmitting the version information and/or checksum to rights management server 210 for verification. For another example, the document may require that certain compliance policies be in effect before the document may be decrypted and/or the functionality be un-restricted. Receiver's device 204 may not be trusted to provide accurate details about its compliance policies, in which case application 208 may send an address of compliance server 220 to rights management server 210 in order to facilitate communication between the two servers. Compliance server 220 and rights management server 210 may the exchange security information such as the state of required compliance policies on receiver's device 204.

Method 300 may then advance to stage 330 where user device 100 may determine whether the security details have been approved. For example, application 208 may receive authorization from rights management server 210 to un-restrict the restricted functionality and/or a decryption key to decrypt the document. In some embodiments, the approval of receiver's device 204 may be cached, such as by compliance server 220 and/or rights management server 210 such that requests to un-restrict a series of documents that comprise the same security requirements may be approved without an exchange of security details each time. Such a cached approval may expire after a configurable length of time, such as an hour.

If the security details are determined to be approved at stage 330, method 300 may advance to stage 335 where user device 100 may un-restrict the functionality. For example, application 208 may decrypt the document using the decryption key provided by rights management server 210.

If the security details are not approved at stage 330, method 300 may advance to stage 340 where user device 100 may attempt to modify the security settings in order to satisfy the identified security requirements. For example, if the security requires that a passcode be in force on receiver's device 204, a user of the receiver's device 204 may be given the opportunity to activate such a passcode. For another example, a user may be prompted to download a new application and/or a different version of an application in order to un-restrict the document. In some embodiments, a user may be informed that a time or location is not approved for un-restricting the document. For example, time-sensitive documents may be restricted from being opened until a certain time and may be re-restricted after another time. Likewise, some documents may be restricted to opening in a given location, such as within a geo-fence boundary around a user's home, office, or work building.

From stage 340, method 300 may advance to stage 350 where user device 100 may determine whether the modified security settings are approved, substantially as described above with respect to stage 330. If so, method 300 may continue to stage 335 where the document may be un-restricted. Otherwise, method 300 may advance to stage 360 where user device 100 may delete the restricted document to prevent unauthorized access. In some embodiments, multiple attempts may be granted to the user to comply with the security requirements. After the document is deleted at stage 360 or the document's functionality has been unrestricted at stage 335, method 300 may end at stage 370.

An embodiment consistent with the disclosure may comprise a system for providing rights management server (RMS) integration with Mobile Device Management (MDM). The system may comprise a memory storage and a processing unit coupled to the memory storage. The processing unit may be operative to restrict at least one functionality associated with the document according to a compliance policy, transmitting the document to at least one device, receive a request to un-restrict the at least one functionality associated with the document, determine whether the at least one device complies with the document management policy, and, in response to determining that the at least one device complies with the document management policy, un-restrict the at least one functionality associated with the document. The document may comprise any type of electronic data, such as an e-mail message, a text message, a word processing document, a spreadsheet, a presentation, an instant message, a binary file, an audio file, a video file, a voicemail, and a contact information document. The foregoing list is presented for example purposes and is non-limiting. The compliance policy may, for example be imposed by an organization associated with the sender of the document. The restricted functionality may comprise, for example, opening the document, forwarding the document, modifying the document, saving the document, deleting the document, opening the document, and sharing the document and such restriction may comprise, for example, embedding control codes, meta-data, and/or instructions in the document and/or encrypting part and/or all of the document. Un-restricting the functionality may require that a compliance policy comprising, for example, a device restriction (e.g., type of device), a device requirement (e.g., a firmware version), a user restriction (e.g., a password, group membership, biometric authentication, etc.), a time restriction, and/or a location restriction. Requests to un-restrict the functionality and the result, whether successful or not, may be logged by the sender and/or the receiver's organization.

Another embodiment consistent with the disclosure may comprise a system for providing rights management server (RMS) integration with Mobile Device Management (MDM). The system may comprise a memory storage and a processing unit coupled to the memory storage. The processing unit may be operative to receive a document comprising at least one restricted functionality, identify a requirement for un-restricting the at least one restricted functionality, satisfy the requirement for un-restricting the at least one restricted functionality, and perform the un-restricted at least one functionality. Identifying the requirement for un-restricting the at least one restricted functionality may comprises, for example, being operative to receive, install, configure, and/or activate a compliance policy from a compliance server. The processing unit may be further operative to facilitate a communication between compliance servers associated with the sender and receiver in order to verify the presence of a required compliance policy and/or security feature. The communication may comprise the sender's compliance server and/or rights management server to inform and/or instruct the recipient's compliance server and/or rights management server to install the required compliance policy on the recipient's device before the document may be un-restricted.

Yet another embodiment consistent with the disclosure may comprise a system for providing rights management server (RMS) integration with Mobile Device Management (MDM). The system may comprise a memory storage and a processing unit coupled to the memory storage. The processing unit may be operative to receive an encrypted document from a sender, identify a first compliance service associated with the sender, facilitate an exchange of a plurality of data between the first compliance server and a second compliance server associated with a recipient of the encrypted document, determine whether the first compliance server is satisfied with the exchanged plurality of data, and if so, receive a decryption key associated with the document, decrypt the document, and display the document. The exchanged plurality of data may comprise, for example, at least one device compliance rule. If the first compliance server is not satisfied with the exchanged plurality of data, the processing unit may be operative to modify a configuration setting associated with the at least one device compliance rule and facilitate a second exchange of a second plurality of data between the first compliance server and the second compliance server. If the first compliance server is not satisfied with the second exchanged plurality of data, the processing unit may be operative to delete the document.

The embodiments and functionalities described herein may operate via a multitude of computing systems, including wired and wireless computing systems, mobile computing systems (e.g., mobile telephones, tablet or slate type computers, laptop computers, etc.). In addition, the embodiments and functionalities described herein may operate over distributed systems, where application functionality, memory, data storage and retrieval and various processing functions may be operated remotely from each other over a distributed computing network, such as the Internet or an intranet. User interfaces and information of various types may be displayed via on-board computing device displays or via remote display units associated with one or more computing devices. For example user interfaces and information of various types may be displayed and interacted with on a wall surface onto which user interfaces and information of various types are projected. Interaction with the multitude of computing systems with which embodiments of this disclosure may be practiced include, keystroke entry, touch screen entry, voice or other audio entry, gesture entry where an associated computing device is equipped with detection (e.g., camera) functionality for capturing and interpreting user gestures for controlling the functionality of the computing device, and the like. The Figures above and their associated descriptions provide a discussion of a variety of operating environments in which embodiments of this disclosure may be practiced. However, the devices and systems illustrated and discussed with respect to the Figures are for purposes of example and illustration and are not limiting of a vast number of computing device configurations that may be utilized for practicing embodiments of this disclosure as described herein.

The term computer readable media as used herein may include computer storage media. Computer storage media may include volatile and nonvolatile, removable and non-removable media implemented in any method or technology for storage of information, such as computer readable instructions, data structures, program modules, or other data. System memory, removable storage, and non-removable storage are all computer storage media examples (i.e., memory storage.) Computer storage media may include, but is not limited to, RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other medium which can be used to store.

The term computer readable media as used herein may also include communication media. Communication media may be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media.

A number of applications and data files may be used to perform processes and/or methods as described above. The aforementioned processes are examples, and a processing unit may perform other processes. Other programming modules that may be used in accordance with embodiments of this disclosure may include electronic mail, calendar, and contacts applications, data processing applications, word processing applications, spreadsheet applications, database applications, slide presentation applications, drawing or computer-aided application programs, etc.

Generally, consistent with embodiments of this disclosure, program modules may include routines, programs, components, data structures, and other types of structures that may perform particular tasks or that may implement particular abstract data types. Moreover, embodiments of the disclosure may be practiced with other computer system configurations, including hand-held devices, multiprocessor systems, microprocessor-based or programmable consumer electronics, minicomputers, mainframe computers, and the like. Embodiments of this disclosure may also be practiced in distributed computing environments where tasks are performed by remote processing devices that are linked through a communications network. In a distributed computing environment, program modules may be located in both local and remote memory storage devices.

Furthermore, embodiments of this disclosure may be practiced in an electrical circuit comprising discrete electronic elements, packaged or integrated electronic chips containing logic gates, a circuit utilizing a microprocessor, or on a single chip containing electronic elements or microprocessors. Embodiments of this disclosure may also be practiced using other technologies capable of performing logical operations such as, for example, AND, OR, and NOT, including but not limited to mechanical, optical, fluidic, and quantum technologies. In addition, embodiments of the disclosure may be practiced within a general-purpose computer or in any other circuits or systems.

Embodiments of this disclosure may, for example, be implemented as a computer process and/or method, a computing system, an apparatus, device, or appliance, and/or as an article of manufacture, such as a computer program product or computer readable media. The computer program product may be a computer storage media readable by a computer system and encoding a computer program of instructions for executing a computer process. The computer program product may also be a propagated signal on a carrier readable by a computing system and encoding a computer program of instructions for executing a computer process. Accordingly, the present disclosure may be embodied in hardware and/or in software (including firmware, resident software, micro-code, etc.). In other words, embodiments of the present disclosure may take the form of a computer program product on a computer-usable or computer-readable storage medium having computer-usable or computer-readable program code embodied in the medium for use by or in connection with an instruction execution system. A computer-usable or computer-readable medium may be any medium that can contain, store, communicate, propagate, or transport the program for use by or in connection with the instruction execution system, apparatus, or device.

The computer-usable or computer-readable medium may be, for example but not limited to, an electronic, magnetic, optical, electromagnetic, infrared, or semiconductor system, apparatus, device, or propagation medium. More specific computer-readable medium examples (a non-exhaustive list), the computer-readable medium may include the following: an electrical connection having one or more wires, a portable computer diskette, a random access memory (RAM), a read-only memory (ROM), an erasable programmable read-only memory (EPROM or Flash memory), an optical fiber, and a portable compact disc read-only memory (CD-ROM). Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

Embodiments of this disclosure may be practiced via a system-on-a-chip (SOC) where each and/or many of the elements described above may be integrated onto a single integrated circuit. Such an SOC device may include one or more processing units, graphics units, communications units, system virtualization units and various application functionalities, all of which may be integrated (or "burned") onto the chip substrate as a single integrated circuit. When operating via an SOC, the functionality, described herein, with respect to training and/or interacting with any element may operate via application-specific logic integrated with other components of the computing device/system on the single integrated circuit (chip).

Embodiments of this disclosure are described above with reference to block diagrams and/or operational illustrations of methods, systems, and computer program products according to embodiments of the disclosure. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

While certain embodiments have been described, other embodiments may exist. Furthermore, although embodiments of the present disclosure have been described as being associated with data stored in memory and other storage mediums, data can also be stored on or read from other types of computer-readable media, such as secondary storage devices, like hard disks, floppy disks, or a CD-ROM, a carrier wave from the Internet, or other forms of RAM or ROM. Further, the disclosed methods' stages may be modified in any manner, including by reordering stages and/or inserting or deleting stages, without departing from the disclosure.

Embodiments of the present disclosure, for example, are described above with reference to block diagrams and/or operational illustrations of methods, systems, and computer program products according to embodiments of the disclosure. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

While certain embodiments of the disclosure have been described, other embodiments may exist. Furthermore, although embodiments of the present disclosure have been described as being associated with data stored in memory and other storage mediums, data can also be stored on or read from other types of computer-readable media, such as secondary storage devices, like hard disks, floppy disks, or a CD-ROM, a carrier wave from the Internet, or other forms of RAM or ROM. Further, the disclosed methods' stages may be modified in any manner, including by reordering stages and/or or inserting or deleting stages, without departing from the disclosure.

All rights including copyrights in any code included herein are vested in and the property of the Assignee. The Assignee retains and reserves all rights in the code included herein, and grants permission to reproduce the material only in connection with reproduction of the granted patent and for no other purpose.

While the specification includes examples, the disclosure's scope is indicated by the following claims. Furthermore, while the specification has been described in language specific to structural features and/or methodological acts, the claims are not limited to the features or acts described above. Rather, the specific features and acts described above are disclosed as example for embodiments of the disclosure.

What is claimed is:

1. A method comprising:
   restricting at least one functionality associated with a document according to a compliance policy, the document being associated with a sender device;
   transmitting the document to at least one recipient device;
   receiving, in a rights management server associated with the sender device, a request to un-restrict the at least one functionality associated with the document, the request being associated with an application associated with viewing of the document on the at least one recipient device;
   receiving, in the rights management server, an indication from a compliance server associated with the at least one recipient device, wherein the rights management server is associated with the sender device and the compliance server is associated with the at least one recipient device, the indication being associated with whether the at least one recipient device complies with the compliance policy;
   determining, in the rights management server, whether the at least one recipient device complies with the compliance policy based at least in part upon the indication received from the compliance server;
   transmitting, from the rights management server to the compliance server, an authorization to un-restrict the at least one functionality associated with the document; and
   in response to determining that the at least one recipient device complies with the compliance policy, initiating un-restricting the at least one functionality associated with the document by the application associated with viewing of the document by the at least one recipient device.

2. The method of claim 1, wherein the document comprises at least one of the following: an e-mail message, a text message, a word processing document, a spreadsheet, a presentation, an instant message, a binary file, an audio file, a video file, a voicemail, and a contact information document.

3. The method of claim 1, wherein the compliance policy is associated with a first organization.

4. The method of claim 3, wherein the sender device of the document is associated with the first organization.

5. The method of claim 4, wherein the at least one recipient device is associated with a second organization.

6. The method of claim 1, wherein the at least one functionality comprises at least one of the following: opening the document, forwarding the document, modifying the document, saving the document, deleting the document, opening the document, and sharing the document.

7. The method of claim 1, wherein restricting the at least one functionality comprises encrypting the document.

8. The method of claim 1, wherein restricting the at least one functionality comprises requiring at least one compliance policy be in effect before the at least one functionality is un-restricted.

9. The method of claim 8, wherein the at least one compliance policy comprises at least one of the following: a device restriction, a device requirement, a user restriction, a time restriction, and a location restriction.

10. The method of claim 1, further comprising: logging the request to un-restrict the at least one functionality associated with the document.

11. A system comprising:
a memory storage; and
a processor coupled to the memory storage, wherein the processor is configured to:
receive a document comprising at least one restricted functionality,
identify a requirement for un-restricting the at least one restricted functionality by receiving a compliance policy from a compliance server, wherein the system is associated with a first user and the compliance server is associated with a second user,
satisfy the requirement for un-restricting the at least one restricted functionality by facilitating a communication between a second compliance server associated with the first user to the compliance server associated with the second user, and
perform the un-restricted at least one functionality.

12. The system of claim 11, wherein the second user comprises a sender of the document.

13. The system of claim 11, wherein being operative to satisfy the requirement for un-restricting the at least one restricted functionality comprises the processor being further operative to instruct the second compliance server to provide at least one compliance policy associated with the system to the compliance server associated with the second user.

14. A non-transitory computer-readable medium which stores a set of instructions that when executed performs a method executed by the set of instructions comprising:
receiving an encrypted document from a sender;
identifying a first compliance server associated with the sender;
facilitating an exchange of a plurality of data between the first compliance server and a second compliance server associated with a recipient of the encrypted document, the exchanged plurality of data comprises at least one device compliance rule;
determining whether the first compliance server is satisfied with the exchanged plurality of data; and
in response to determining that the first compliance server is satisfied with the exchanged plurality of data:
receiving a decryption key associated with the document,
decrypting the document, and
displaying the document;
in response to determining that the first compliance server is not satisfied with the exchanged plurality of data:
modifying a configuration setting associated with the at least one device compliance rule, and
facilitating a second exchange of a second plurality of data between the first compliance server and the second compliance server.

15. The non-transitory computer-readable medium of claim 14, further comprising:
determining whether the first compliance server is satisfied with the second exchanged plurality of data; and
in response to determining that the first compliance server is not satisfied with the exchanged plurality of data, deleting the document.

\* \* \* \* \*